(12) United States Patent
Kim et al.

(10) Patent No.: US 9,508,167 B2
(45) Date of Patent: Nov. 29, 2016

(54) METHOD AND APPARATUS FOR HIGH-DIMENSIONAL DATA VISUALIZATION

(71) Applicant: Samsung Electronics Co., Ltd., Suwon-si (KR)

(72) Inventors: Ha-Young Kim, Hwaseong-si (KR); Hyoung-Min Park, Yongin-si (KR); Haesun Park, Johns Creek, GA (US); Jae-Gul Choo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 14/176,301

(22) Filed: Feb. 10, 2014

(65) Prior Publication Data

US 2014/0225889 A1 Aug. 14, 2014

(30) Foreign Application Priority Data

Feb. 8, 2013 (KR) .................. 10-2013-0014599

(51) Int. Cl.
*G06T 15/00* (2011.01)
*G06T 11/20* (2006.01)
*G06T 19/00* (2011.01)

(52) U.S. Cl.
CPC ............. *G06T 11/206* (2013.01); *G06T 19/00* (2013.01)

(58) Field of Classification Search
CPC ... G06T 15/005; G06T 19/00; G06T 11/206; G06T 13/00
See application file for complete search history.

(56) References Cited

U.S. PATENT DOCUMENTS

| 5,461,708 | A | * | 10/1995 | Kahn | G06T 11/206 345/440 |
|---|---|---|---|---|---|
| 5,592,599 | A | * | 1/1997 | Lindholm | G06T 3/005 345/427 |
| 5,619,709 | A | * | 4/1997 | Caid | G06F 17/30265 704/9 |
| 5,864,482 | A | * | 1/1999 | Hazama | G05B 19/4097 700/182 |
| 5,886,897 | A | * | 3/1999 | Hazama | G05B 19/4097 700/182 |
| 5,894,311 | A | * | 4/1999 | Jackson | G06F 17/30398 345/440 |
| 5,917,500 | A | * | 6/1999 | Johnson et al. | 345/440 |
| 5,966,139 | A | * | 10/1999 | Anupam et al. | 345/440 |
| 6,100,901 | A | * | 8/2000 | Mohda et al. | 345/440 |
| 6,295,514 | B1 | * | 9/2001 | Agrafiotis | B01J 19/0046 702/179 |
| 6,374,251 | B1 | * | 4/2002 | Fayyad | G06F 17/30705 |
| 6,384,847 | B1 | | 5/2002 | Rabenhorst | |
| 6,518,989 | B1 | * | 2/2003 | Ishikawa | G06T 19/00 715/757 |
| 6,591,235 | B1 | * | 7/2003 | Chen et al. | 704/236 |

(Continued)

FOREIGN PATENT DOCUMENTS

JP 2008-77203 A 4/2008
KR 10-2004-0101477 A 12/2004

(Continued)

*Primary Examiner* — Phi Hoang
*Assistant Examiner* — Charles L Beard
(74) *Attorney, Agent, or Firm* — NSIP Law

(57) ABSTRACT

A method and an apparatus are provided to visualize high-dimensional data. The method includes primarily visualizing the high-dimensional data at a dimension lower than the high-dimensional data to obtain a primarily-visualized image. The method also includes secondarily visualizing the high-dimensional data in an area of the primarily-visualized image at a dimension higher than the primarily-visualized image to obtain a secondarily-visualized image.

24 Claims, 18 Drawing Sheets
(14 of 18 Drawing Sheet(s) Filed in Color)

(56) References Cited

U.S. PATENT DOCUMENTS

| | | | |
|---|---|---|---|
| 6,621,412 B1* | 9/2003 | Markle | H01L 22/20 257/E21.525 |
| 6,707,454 B1* | 3/2004 | Barg et al. | 345/440 |
| 6,873,325 B1* | 3/2005 | Kontkanen et al. | 345/440 |
| 6,990,238 B1* | 1/2006 | Saffer | G06F 17/30716 382/224 |
| 7,038,680 B2* | 5/2006 | Pitkow | G06T 11/206 345/440 |
| 8,326,662 B1* | 12/2012 | Byrne | G06Q 30/0201 705/7.11 |
| 8,499,284 B2* | 7/2013 | Pich | G06K 9/6251 717/107 |
| 8,527,909 B1* | 9/2013 | Mullany | G06F 3/0484 345/173 |
| 8,600,718 B1* | 12/2013 | Stepaniants | G06F 19/18 703/11 |
| 8,982,131 B1* | 3/2015 | Maswadeh | H04N 5/247 345/440 |
| 9,025,858 B2* | 5/2015 | Seong | G06T 11/008 382/128 |
| 9,070,227 B2* | 6/2015 | Drucker | G06T 13/80 |
| 9,091,140 B1* | 7/2015 | Selman | E21B 7/04 |
| 9,123,000 B2* | 9/2015 | Gartner | G06Q 10/04 |
| 9,275,483 B2* | 3/2016 | Chu | G06T 11/206 |
| 2002/0091655 A1* | 7/2002 | Agrafiotis et al. | 706/26 |
| 2003/0023715 A1* | 1/2003 | Reiner | G06F 11/32 709/224 |
| 2003/0144868 A1* | 7/2003 | MacIntyre et al. | 705/1 |
| 2003/0200191 A1* | 10/2003 | Pao | G06K 9/6253 706/47 |
| 2003/0218619 A1* | 11/2003 | Ben-Tovim | G06F 3/04845 345/649 |
| 2004/0252879 A1* | 12/2004 | Tiemeyer | G01N 21/9501 382/145 |
| 2005/0075875 A1* | 4/2005 | Shozakai et al. | 704/231 |
| 2006/0031187 A1* | 2/2006 | Pyrce | G06F 3/04815 |
| 2006/0061589 A1* | 3/2006 | Suyama et al. | 345/606 |
| 2006/0290695 A1* | 12/2006 | Salomie | 345/420 |
| 2007/0046666 A1* | 3/2007 | Kokojima et al. | 345/427 |
| 2007/0081710 A1* | 4/2007 | Hong et al. | 382/128 |
| 2007/0188520 A1* | 8/2007 | Finley | G06Q 10/10 345/619 |
| 2007/0192728 A1* | 8/2007 | Finley | G06F 3/0481 715/782 |
| 2008/0049991 A1* | 2/2008 | Gering | 382/128 |
| 2008/0079723 A1* | 4/2008 | Hanson | G06K 9/0063 345/427 |
| 2008/0100621 A1* | 5/2008 | Aharon et al. | 345/424 |
| 2008/0192056 A1* | 8/2008 | Robertson | G06T 13/80 345/440 |
| 2008/0235075 A1* | 9/2008 | Couture | G06F 11/3495 709/224 |
| 2009/0027380 A1* | 1/2009 | Rajan et al. | 345/419 |
| 2009/0037507 A1* | 2/2009 | Rosman et al. | 708/441 |
| 2009/0232353 A1* | 9/2009 | Sundaresan | G06K 9/00342 382/103 |
| 2009/0232388 A1* | 9/2009 | Minear et al. | 382/154 |
| 2009/0237411 A1* | 9/2009 | Gossweiler, III | G06T 19/00 345/473 |
| 2009/0252436 A1* | 10/2009 | Eidenzon et al. | 382/285 |
| 2010/0005411 A1* | 1/2010 | Duncker | G06F 17/30873 715/769 |
| 2010/0014781 A1* | 1/2010 | Liu | H04N 13/0022 382/285 |
| 2010/0033485 A1* | 2/2010 | Kothari et al. | 345/440 |
| 2010/0162152 A1* | 6/2010 | Allyn | G06F 11/206 715/767 |
| 2010/0194742 A1* | 8/2010 | Lecerf et al. | 345/419 |
| 2010/0194778 A1* | 8/2010 | Robertson et al. | 345/619 |
| 2010/0274539 A1* | 10/2010 | Virkar et al. | 703/2 |
| 2010/0329535 A1* | 12/2010 | Macenko | G06K 9/0014 382/133 |
| 2011/0032338 A1* | 2/2011 | Raveendran | H04N 21/816 348/51 |
| 2011/0040168 A1* | 2/2011 | Arnaud | G06T 7/0012 600/407 |
| 2011/0044447 A1* | 2/2011 | Morris | G06T 11/206 379/265.03 |
| 2011/0148914 A1* | 6/2011 | Kim | G06T 11/206 345/619 |
| 2011/0160576 A1* | 6/2011 | Bower et al. | 600/425 |
| 2011/0225208 A1* | 9/2011 | Boersma et al. | 707/803 |
| 2011/0285712 A1* | 11/2011 | Arai | G09G 3/003 345/426 |
| 2012/0013619 A1* | 1/2012 | Brath | 345/441 |
| 2012/0013710 A1* | 1/2012 | Ehrlich et al. | 348/46 |
| 2012/0116687 A1* | 5/2012 | Kanderian | C12Q 1/6827 702/20 |
| 2012/0162372 A1* | 6/2012 | Ghyme | 348/46 |
| 2012/0173215 A1* | 7/2012 | Buchan | G06F 19/327 703/6 |
| 2012/0189176 A1* | 7/2012 | Giger et al. | 382/128 |
| 2012/0233573 A1* | 9/2012 | Sullivan | G06F 3/048 715/848 |
| 2012/0239309 A1* | 9/2012 | Russak | G06F 19/707 702/30 |
| 2012/0283962 A1* | 11/2012 | Russak | G01N 31/10 702/32 |
| 2012/0317509 A1* | 12/2012 | Ludwig | G06T 11/206 715/781 |
| 2013/0088517 A1* | 4/2013 | McKenna et al. | 345/635 |
| 2013/0201191 A1* | 8/2013 | Morinaga et al. | 345/440 |
| 2013/0300743 A1* | 11/2013 | Degrell | G06T 11/206 345/440 |
| 2014/0028683 A1* | 1/2014 | Luo | G06T 11/206 345/440.2 |
| 2014/0043331 A1* | 2/2014 | Makinen | G06T 15/40 345/424 |
| 2014/0071133 A1* | 3/2014 | Chu | G06T 11/206 345/440 |
| 2015/0205692 A1* | 7/2015 | Seto | G06F 11/3452 702/182 |
| 2015/0205693 A1* | 7/2015 | Seto | G06F 11/3065 702/186 |

FOREIGN PATENT DOCUMENTS

| | | |
|---|---|---|
| KR | 10-0849631 B1 | 7/2008 |
| WO | WO 03/090167 A2 | 10/2003 |

* cited by examiner

METHOD AND APPARATUS FOR HIGH-DIMENSIONAL DATA VISUALIZATION

CROSS-REFERENCE TO RELATED APPLICATION(S)

This application claims the benefit under 35 U.S.C. §119 (a) of Korean Patent Application No. 10-2013-0014599, filed on Feb. 8, 2013, in the Korean Intellectual Property Office, the entire disclosure of which is incorporated herein by reference for all purposes.

BACKGROUND

1. Field

The following description relates to method and apparatus for high-dimensional data visualization.

2. Description of the Related Art

Analyzing large amounts of data and utilizing such analyzed data is increasingly important for applications processing an overflow of various and plentiful information. Because complex data in various applications are mainly shown as a high-dimensional vector, analytical methods through visualization, including human insight, are becoming more important, along with calculation methods. A dimension reduction technique is a method generally used to visualize high-dimensional data. The dimension reduction technique can convert high-dimensional data into two-dimensional data or three-dimensional data, which can be visible to humans.

However, the dimension reduction technique causes losses and distortion of data. As a result, visualizing high-dimensional data into three-dimensional data has less losses and distortions than visualizing the high-dimensional data to two-dimensional data. Furthermore, visualizing high-dimensional data into two-dimensional data has more advantages than visualizing the high-dimensional data into three-dimensional data due to immediacy of a visualized image and conveniences in interaction.

Despite those advantages and disadvantages of two-dimensional or three-dimensional visualization, the conventional art is limited to visualizing only in one of two-dimensional data or three dimensional data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with a general aspect, there is provided a method to visualize high-dimensional data. The method includes primarily visualizing the high-dimensional data at a dimension lower than the high-dimensional data to obtain a primarily-visualized image; and secondarily visualizing the high-dimensional data in an area of the primarily-visualized image at a dimension higher than the primarily-visualized image to obtain a secondarily-visualized image.

The primarily visualizing further includes visualizing the high-dimensional data in two dimensions.

The secondarily visualizing further includes visualizing the high-dimensional data in three dimensions.

The primarily visualizing further includes converting the high-dimensional data into a lower-dimensional data, and primarily visualizing the converted lower-dimensional data.

The secondarily visualizing further includes selecting a region of interest (ROI) in the primarily-visualized image; converting the high-dimensional data in the selected ROI into a higher-dimensional data; and secondarily visualizing the converted higher-dimensional data.

The selecting of the ROI includes selecting an area of the primarily-visualized image.

The secondarily visualizing further includes at least one of enlarging, reducing, and rotating the secondarily-visualized image.

The method also includes primarily visualizing a rotated secondarily-visualized image.

The primarily visualizing includes obtaining the primarily-visualized image as a scatter plot.

The secondarily visualizing includes obtaining the secondarily-visualized image as a scatter plot.

In accordance with an illustrative example, there is provided an apparatus for visualizing high-dimensional data. The apparatus includes a primary visualization unit configured to primarily visualize the high-dimensional data at a dimension lower than the high-dimensional data to obtain a primarily-visualized image; and a secondary visualization unit configured to a secondarily visualize the high-dimensional data in an area of the primarily-visualized image at a dimension higher than the primarily-visualized image to obtain a secondarily-visualized image.

A user interaction unit is configured to display at least one of the primarily-visualized image and the secondarily-visualized image and including a user interface.

The primary visualization unit primarily visualizes the high-dimensional data in two-dimensions.

The secondary visualization unit secondarily visualizes the high-dimensional data in three-dimensions.

The primary visualization unit is further configured to convert the high-dimensional data into a lower-dimensional data, and primarily visualize the converted lower-dimensional data.

The secondary visualization unit is further configured to select a region of interest (ROI) in the primarily-visualized image, convert the high-dimensional data in the selected ROI into a higher-dimensional data, and secondarily visualize the converted higher-dimensional data.

The secondary visualization unit selects the ROI from at least one of the areas of the primarily-visualized image.

The secondary visualization unit is further configured to at least one of enlarge, reduce, and rotate the secondarily-visualized image.

The primary visualization unit is further configured to primarily visualize a rotated secondarily-visualized image.

The primary visualization unit is further configured to obtain the primarily-visualized image as a scatter plot.

The secondary visualization unit is further configured to obtain the secondarily-visualized image as a scatter plot.

In accordance with an illustrative example, there is provided a method to visualize high-dimensional data. The method includes converting the high-dimensional data into data to display a primarily-visualized image, wherein the data is lower-dimensional than the high-dimensional data; selecting a region of interest (ROI) from the primarily-visualized image; and converting the high-dimensional data in the selected ROI into higher-dimensional data than the high-dimensional data in the primarily-visualized image to display a secondarily-visualized image.

The method also includes changing dimensions of the primarily-visualized image and the secondarily-visualized image according to at least one of a dimension and characteristics of data, an availability of data analysis, and a user input.

The method also includes enabling dimensions of the primarily-visualized image and the secondarily-visualized image to be selected through a user interaction unit.

The method also includes configuring the high-dimensional data to be four-dimensional; and configuring the primarily-visualized image to be one-dimensional to three-dimensional.

The method also includes configuring the secondarily-visualized image to be dimensionally greater than the primarily-visualized image.

The converting of the secondarily-visualized image into a primarily-visualized image includes rotating the secondarily-visualized image and projecting the rotated image.

The method also includes performing at least one of enlarging, rotating, and reducing the secondarily-visualized image.

Other features and aspects may be apparent from the following detailed description, drawings, and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
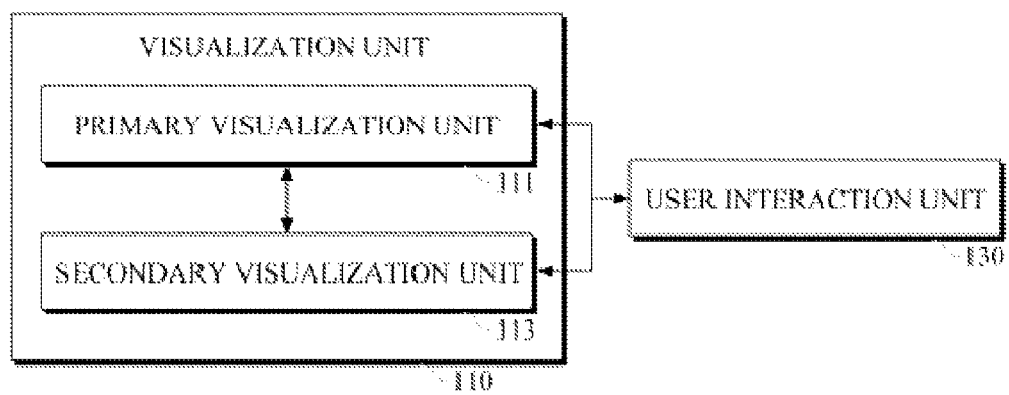
FIG. 1 is a diagram illustrating an example of an apparatus to perform high-dimensional data visualization, in accordance with an illustrative configuration.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of an apparatus to perform high-dimensional data visualization, in accordance with an illustrative configuration.

According to an exemplary embodiment, referring to FIG. 1, an apparatus configured to perform high-dimensional data visualization includes a visualization unit 110 and a user interaction unit 130.

The visualization unit 110 produces or creates visualization images to help users easily understand and analyze high-dimensional data. In an embodiment, the visualization unit 110 includes a primary visualization unit 111, which primarily visualizes high-dimensional data, and a secondary visualization unit 113. In one example, the primarily visualization unit 111 produces a primarily-visualized image that has a lower dimension or low-dimensional data than high-dimensional data and a secondarily-visualized image, which will be later described. For instance, if the high-dimensional data is four-dimensional, the primarily visualized image may be one-dimensional to three-dimensional. In another example, the primarily-visualized image may have a lower than the high dimensional data only.

In the illustrative example of FIG. 1, the primary visualization unit 111 creates the primarily-visualized image by converting the high-dimensional data into a lower dimension to primarily visualize lower-dimensionally-converted data. In one example, various dimension reduction techniques to convert high-dimensional data to lower-dimensionally-converted data as a primarily-visualized image may be used including, but not limited to, a feature extraction such as principal component analysis (PCA), non-negative matrix factorization (NMF), multidimensional scaling (MDS), isomap, local linear embedding (LLE), and linear discriminant analysis (LDA). The primary visualization unit 111 may also include a feature selection such as, but not limited to, information gain, and mutual information. The dimension reduction is not, however, limited to the techniques written above, and various dimension reduction techniques may be used according to a dimension of the primarily-visualized image, characteristics of data, and a form of the primarily-visualized image.

In an embodiment, the primary visualization unit 111 converts the secondarily-visualized image, which is rotated into the primarily-visualized image.

In the embodiment, the visualization unit 110 also includes a secondary visualization unit 113 that secondarily visualizes the high-dimensional data included in at least one of the areas of the primarily-visualized image. In one example, the secondarily-visualized image is dimensionally higher than the primarily-visualized image. For example, if high-dimensional data is four-dimensional and the primarily-visualized image is two-dimensional, then the secondarily-visualized image is visualized in three or four dimensions.

In addition, the secondary visualization unit 113 converts the high-dimensional data in at least one of the areas of the primarily-visualized image into a higher-dimensional data than the low-dimensional data of the primarily-visualized image, and visualizes the higher-dimensionally-converted data. In accordance with an illustrative example, techniques to convert the high-dimensional data to secondarily visualizing are such as the dimension reduction techniques used in the primary visualization unit 111. Not limited to these, however, the dimension reduction techniques, which are used in primarily visualizing and secondarily visualizing, may be different according to a dimension of the visualization, characteristics of data, and a form of the visualization.

In one embodiment, a user may select dimensions of the primarily-visualized image and the secondarily-visualized image through a user interface, which is provided in a user interaction unit 130. In another embodiment, the dimensions of the primarily-visualized image and the secondarily-visualized image may be simultaneously or independently created according to a predefined dimension. In other words, the dimensions of the primarily-visualized image and the secondarily-visualized image may be changed according to a dimension and characteristics of data, an availability of data analysis, and the user's choice.

The user interaction unit 130 includes the user interface displays the visualized image created in the visualization unit 110. In an embodiment, the user interaction unit 130 displays at least one of the primarily-visualized image and the secondary visualized image, which are created in the visualization unit 110. In one example, the user interaction unit 130 includes a screen or display or similar mechanism to enable a display of the visualized image. At this time, in an embodiment, the means for displaying may be implemented in various forms such as light emitting diode (LED), liquid crystal display (LCD), and plasma display panel (PDP).

In one embodiment, the user interaction unit 130 directs the user interface to provide an analytical tool to analyze the visualized data, and acquire various inputs from the user through input devices such as keyboards, mice, touch pads, or touch screens. For example, the user may filter data using keywords or a conditional search from inputs received through the user interface and select data using the drag and drop of a mouse. The user may also check for specific information of the displayed data that are visualized and enlarge, reduce and rotate the visualized image using a mouse or touch pad. The user may then select the dimension and form of the primarily-visualized image and the secondarily-visualized image.

In an embodiment, the user selects at least one of the areas of the primarily-visualized image as a region of interest (ROI), using the user interface provided in the user interaction unit 130. For example, the user may select as the region of interest at least some areas of the primarily-visualized images which are displayed. The secondary visualization unit 113 visualizes the high-dimensional data, which is included in the region of interest.

The visualization unit 110, the primary visualization unit 111, the secondary visualization unit 113, and the user interaction unit 130 and apparatuses described herein may be implemented using hardware components. The hardware components may include, for example, controllers, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

FIG. 2A to FIG. 4D are diagrams illustrating examples of primarily visualizing and secondarily visualizing, in accordance with an illustrative configuration.

Although a two-dimensional visualization and a three-dimensional visualization are illustrated in FIG. 2A to FIG. 4D in a form of a scatter plot, those are exemplary, and the form of the visualization is not limited to the scatter plot. In other words, the primarily-visualized image and the secondarily-visualized image may have various forms depending on data characteristics, an availability of analyzing and a dimension of the visualization.

Also, the primarily visualizing and the secondarily visualizing are not limited to a two-dimensional visualization or a three-dimension visualization, and may be visualized in various dimensions according to the dimension of the high-dimensional data, a user's selection or a predefined set value. For example, the form and dimension of the primarily-visualized image and the secondarily-visualized image may be created according to a predefined form and predefined dimension. In another embodiment, the form and dimension of the primarily-visualized image and the secondarily-visualized image may be implemented to be dynamically, in real-time selected by the user via the user interface provided in the user interaction unit 130.

In various embodiments illustrated in FIGS. 2A to 4D, each of the dots represents each high-dimensional data. Also, each of the colors of each of the dots represents each of the classes which the data is included in, and dots in the same color represent data which is classified as the same class.

Figure 2A:
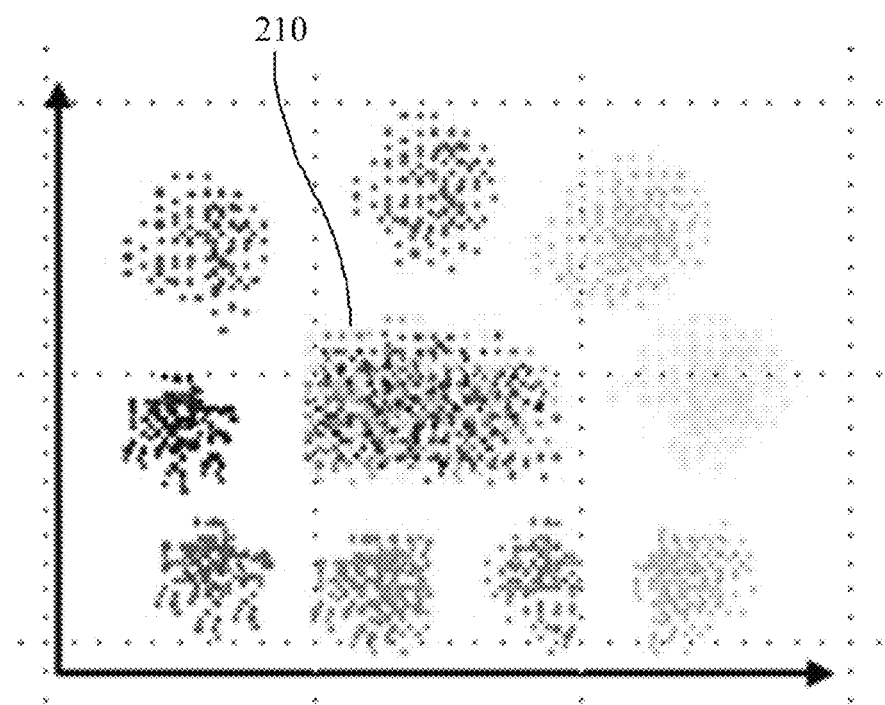
FIG. 2A to FIG. 4D are diagrams illustrating examples of primarily visualizing and secondarily visualizing, in accordance with an illustrative configuration.

FIG. 2A represents an example of the primarily-visualized image in a form of the scatter plot, which is visualized in two dimensions. Referring to FIG. 2A, dots that are classified into the same class are concentrated in each area of the primarily-visualized image. As a result of such dot arrangement, characteristics of the data corresponding to each of the classes may be observed immediately. Furthermore, in case of an area 210, in which dots corresponding to each different class are scattered, it may not be clearly understandable the differences the characteristics of the dots between each class.

Figure 2B:
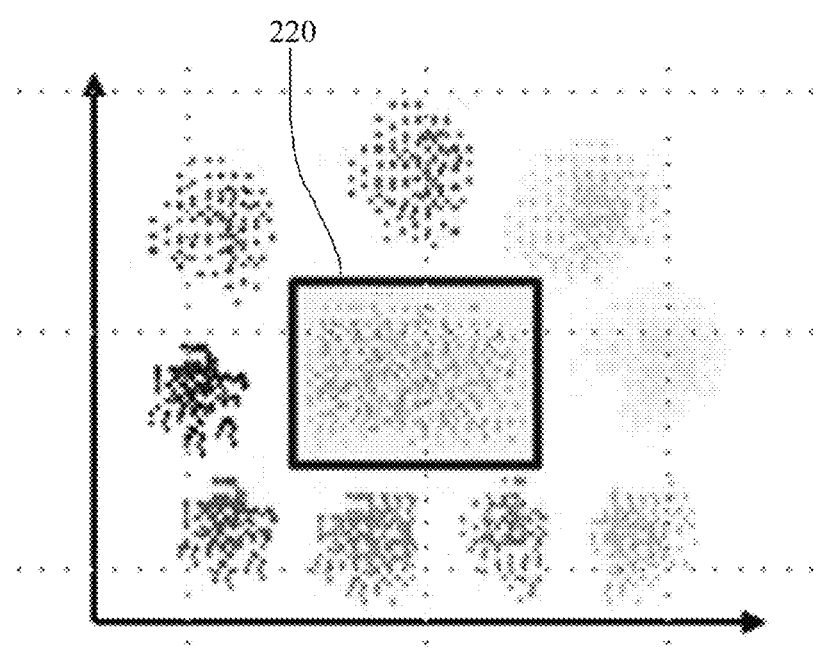

In one example, in an embodiment illustrated in FIG. 2B, an area 220 is an area in which dots classified into each different class are concentrated and mixed. Such area 220 may be selected as a ROI. At this time, the ROI may be selected by the user using input devices such as a mouse, a keyboard, or a touch screen.

Figure 2C:
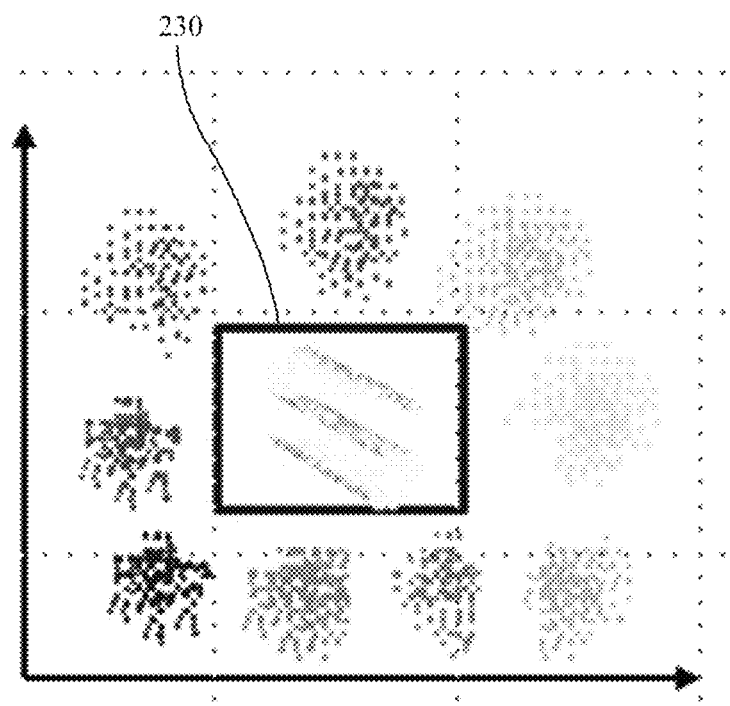

Also, when the ROI is selected, the high-dimensional data, which is included in the ROI selected in the primarily-visualized image, is secondarily visualized as illustrated in 230 as an example illustrated in FIG. 2C. In the embodiment illustrated in FIG. 2C, because the scattered dots in the primarily-visualized image are clearly classified and shown, differences between characteristic for each of the classes may be immediately recognized.

Figure 2D:
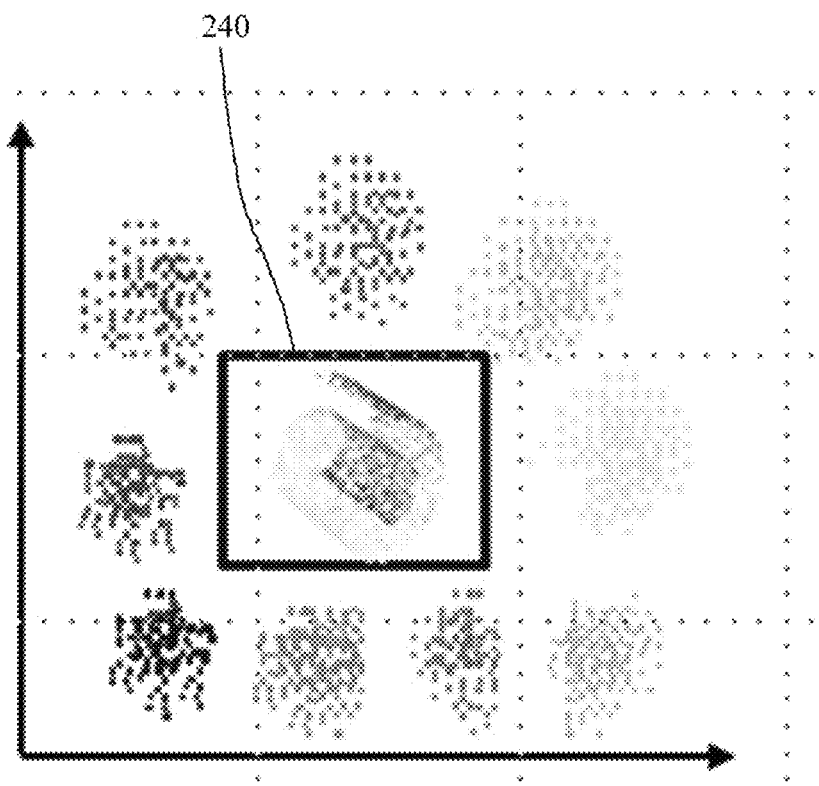

In one illustrative example, the secondarily-visualized image may be capable to be rotated, reduced, and/or enlarged to enable the user to more closely analyze the data. For example, FIG. 2D is a diagram illustrating the secondarily-visualized image 240, which the secondarily-visualized image 230 of FIG. 2C being rotated. Distribution of the dots of every class in a secondarily-visualized image 240 in FIG. 2D is clearly shown and classified in contrast with the dots of the secondarily-visualized image 230 in FIG. 2C. In other words, the user is enabled to easily and closely analyze the characteristics of the data by rotating, enlarging and/or reducing the secondarily-visualized image.

Figure 2E:
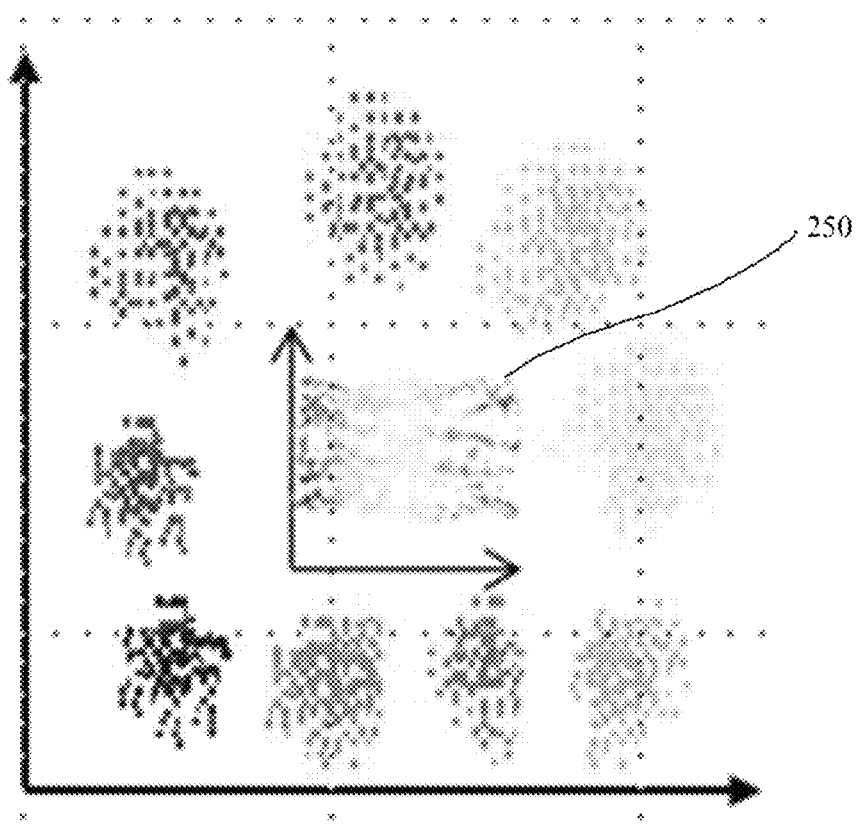
Figure 2F:
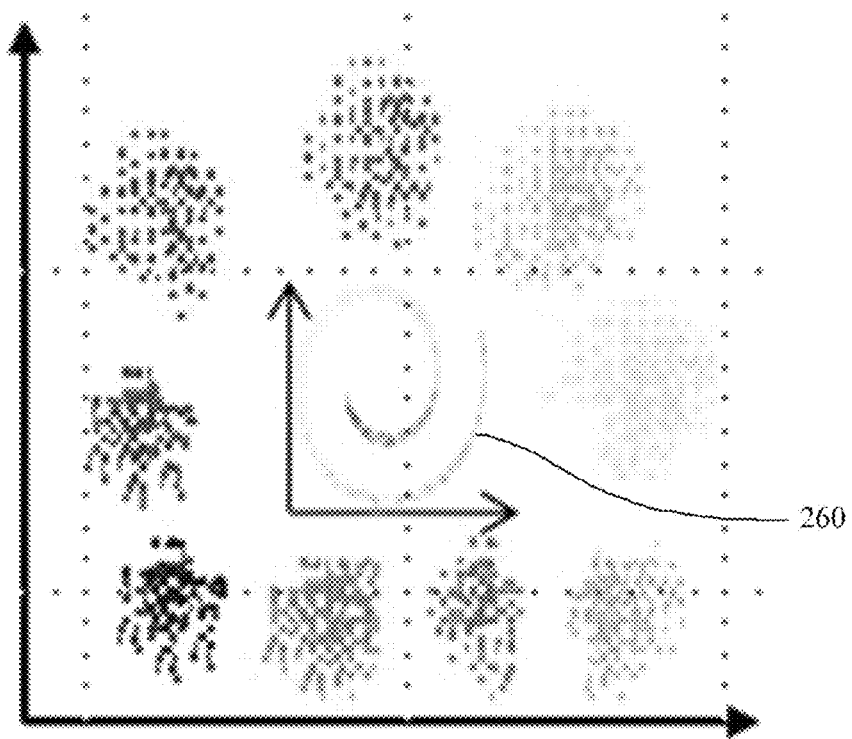

In the exemplary embodiment, the secondarily-visualized image may be converted into a primarily-visualized image by projecting the secondarily-visualized image. In other words, as illustrated in FIG. 2E to 2F, the secondarily-visualized image may be rotated in a direction where the differences in characteristics of the dots corresponding to each class are clearly shown, and then projected in two dimensions, whereby the secondarily-visualized image may be converted into a primarily-visualized image 250 and 260.

Figure 3A:
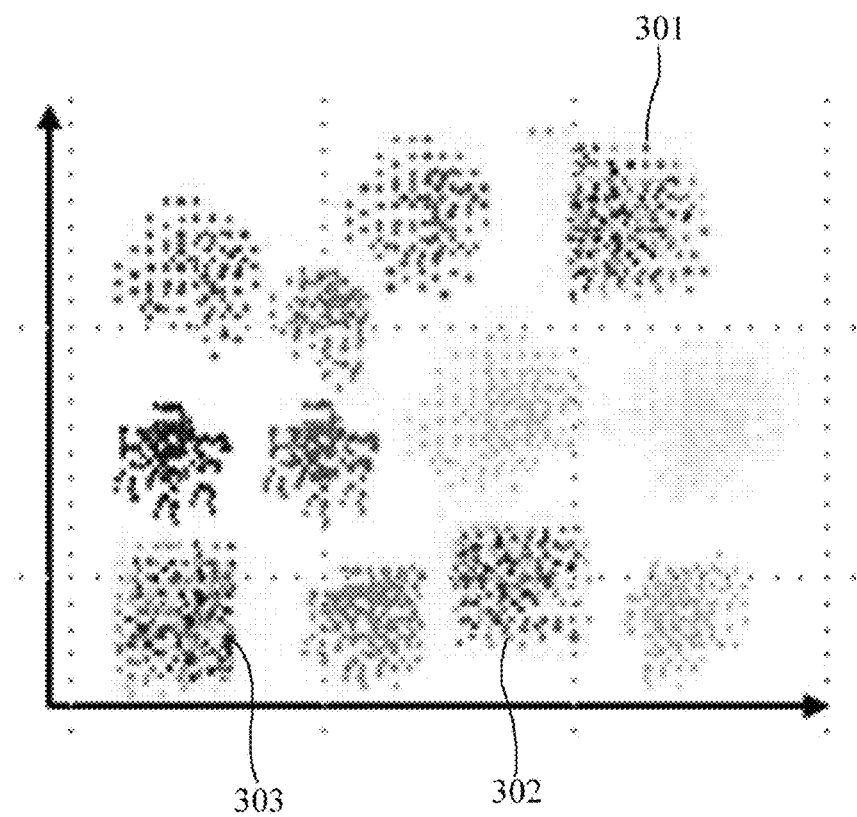
Figure 3B:
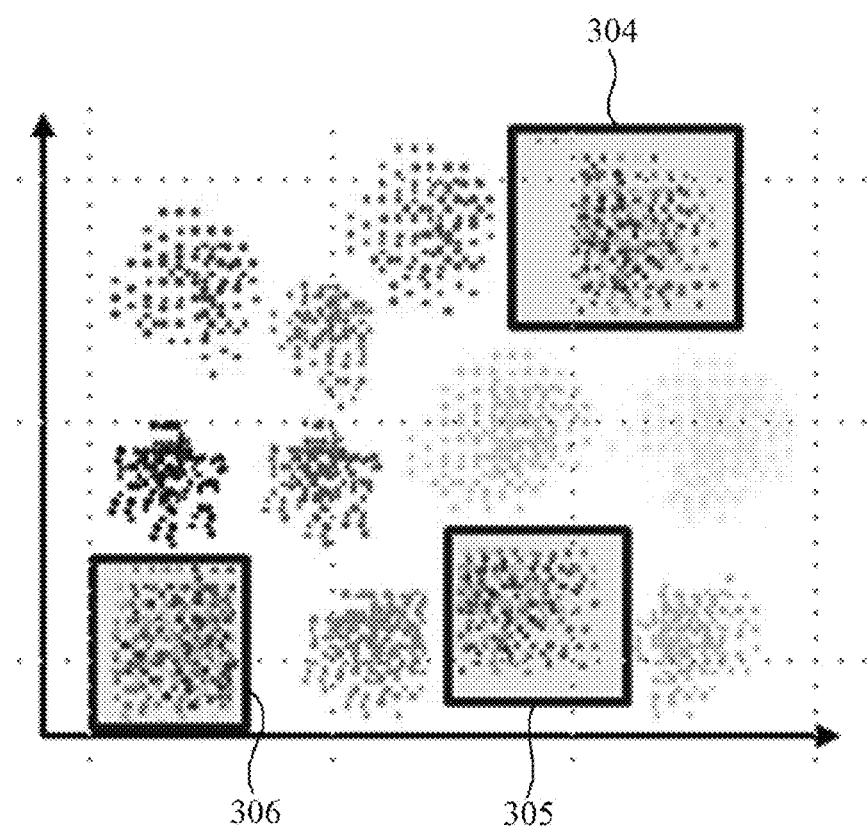

In the exemplary embodiment, at least one of the areas may be selected as the ROI in the primarily-visualized image. In case of several areas 301, 302, 303 in which dots corresponding to each different class are scattered in the primarily-visualized image and exist as illustrated in FIG. 3A, at least one of the areas may be selected as ROIs 304, 305, and 306, as illustrated in FIG. 3B.

Figure 3C:
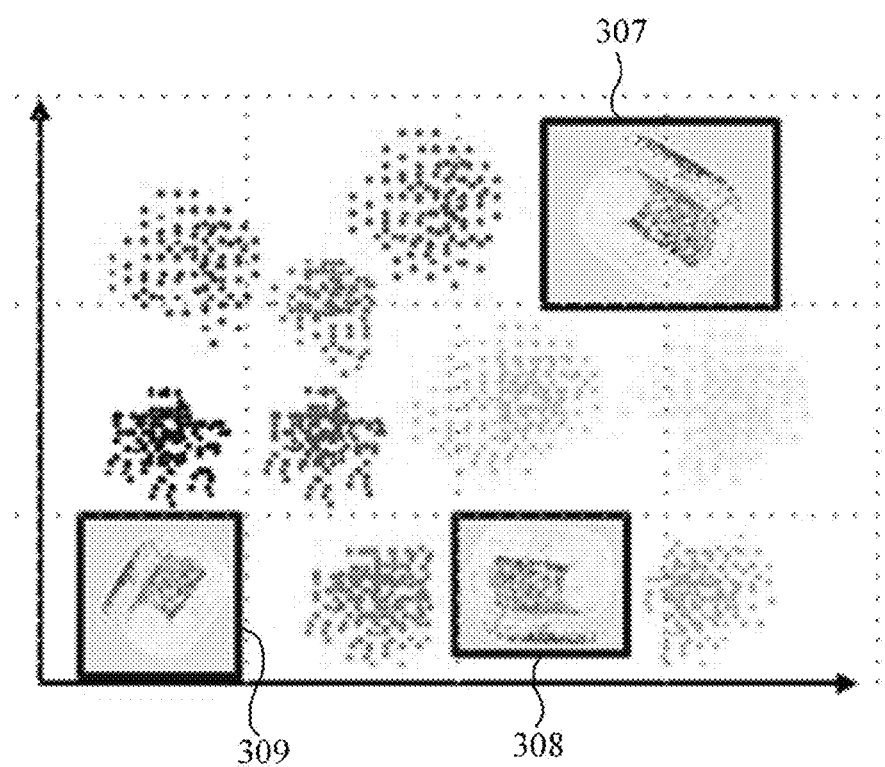

Also, each piece of high-dimensional data that is included in the selected ROIs 304, 305, and 306 may be secondarily visualized individually as illustrated in FIG. 3C. Several of the secondarily-visualized images 307, 308, 309 as illustrated in FIG. 3C may be enlarged, reduced and/or rotated.

Figure 3D:
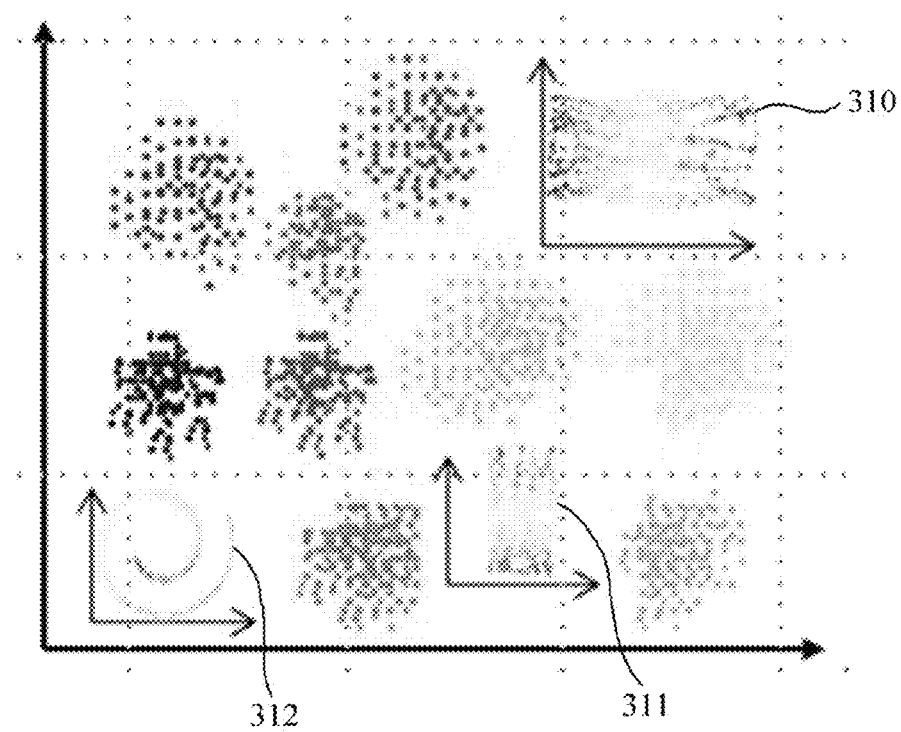

In one example, each of the secondarily-visualized images may be converted into the primarily-visualized image 310, 311 and 312, as illustrated in FIG. 3D, by rotating them in a direction where characteristics of the dots corresponding to each class are most shown, and then projecting the rotated secondarily-visualized images in two dimensions.

In the various examples illustrated in FIG. 2A to FIG. 3D, areas 210, 301, 302, and 303 include dots corresponding to each different class are scattered and are selected as ROIs. In an alternative example, the user may select as ROIs concentrated areas of the primarily-visualized image including dots classified into the same class. In addition, the concentrated areas may be secondarily visualized, and the characteristics of the data included in the corresponding classes may be shown more closely.

Figure 4A:
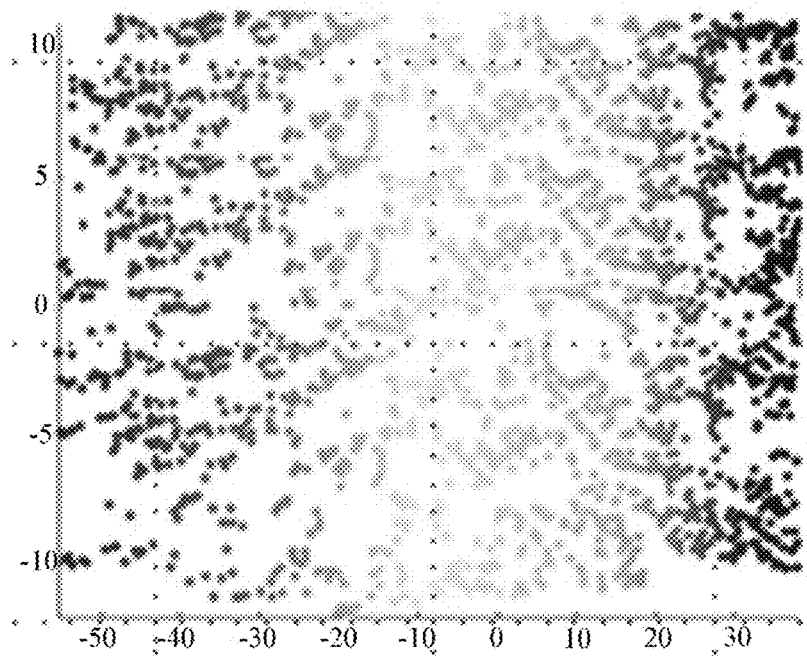
Figure 4B:
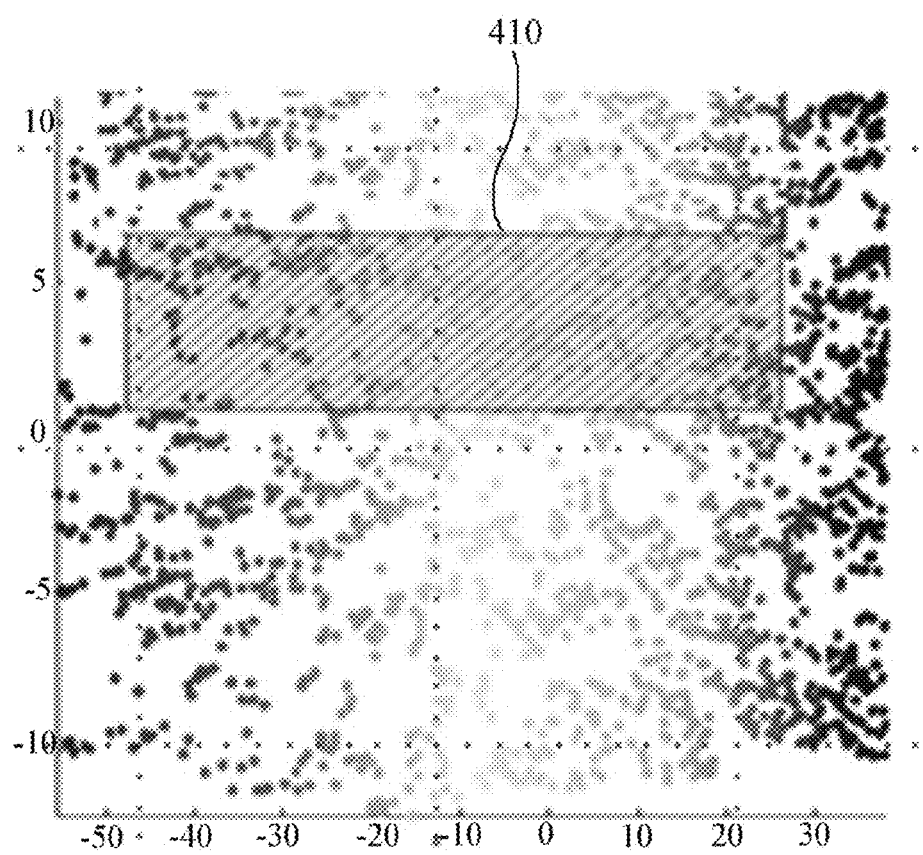

If a primarily-visualized image is created as illustrated in FIG. 4A, after setting up a predefined size of a window 410 as illustrated in FIG. 4B, every area or portion of the primarily-visualized image may be sequentially secondarily visualized. For example, when the user cannot decide which part or parts of a primarily-visualized image to select as ROIs, or when the user may desire to generally grasp characteristics of the high-dimensional data which may not be shown easily in the primarily-visualized image, the user may set-up the window 410, as shown in FIG. 4B. The window 410 may be set-up such that each portion of the primarily-visualized image corresponding to the window 410 can be, in one example, sequentially secondarily visualized.

Figure 4C:
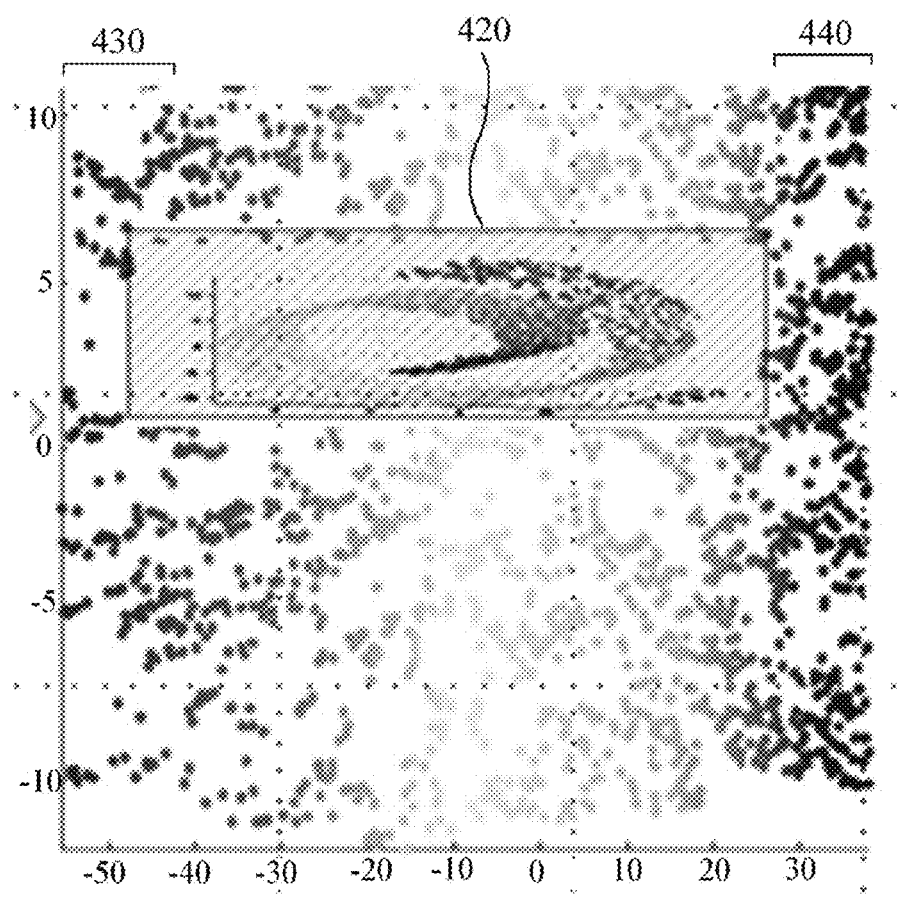

Although each of the dots in the primarily-visualized image illustrated in FIG. 4A appears clearly classified for every class, a manifold which may possibly not be shown in the primarily-visualized image, may be recognized in a secondarily-visualized image 420 as illustrated in FIG. 4C. In other words, it may be known that a blue area 440, which is shown to be most far away from a red area 430, in the primarily-visualized image, is shown close to the red area in the secondarily-visualized image 420.

Figure 4D:
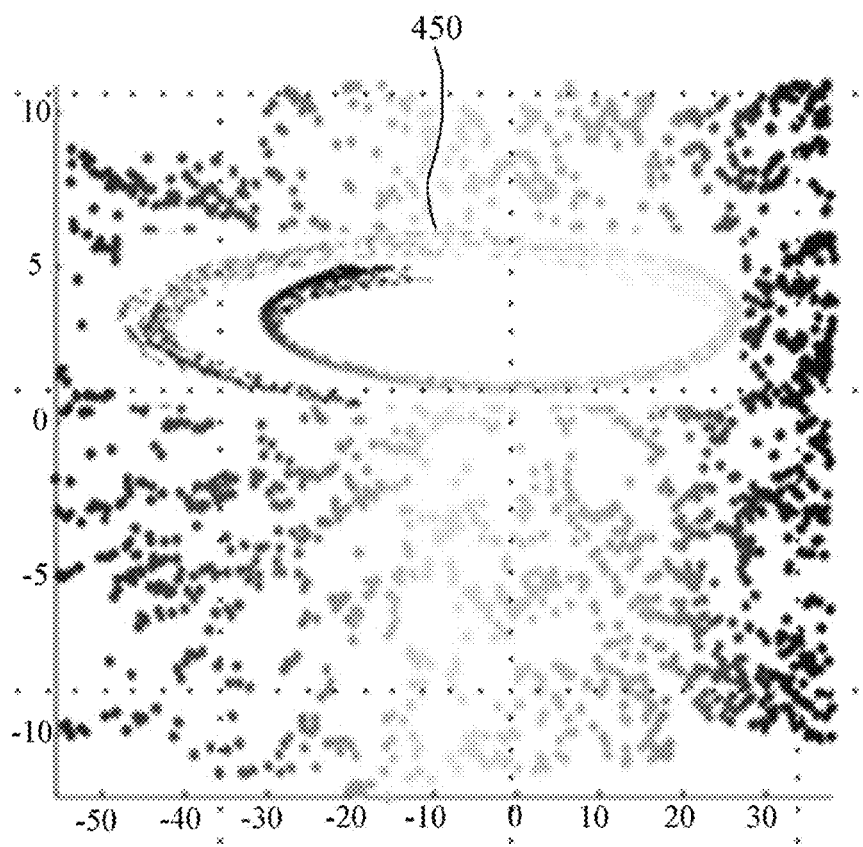

In the illustrative example of FIG. 4D, the secondarily-visualized image is converted into a primarily-visualized image 450 by rotating the primarily-visualized image 450 in a direction in which the manifold, which is not recognized in the primarily-visualized image as shown the most, and then projecting the rotated secondarily-visualized image in two dimensions.

Figure 5:
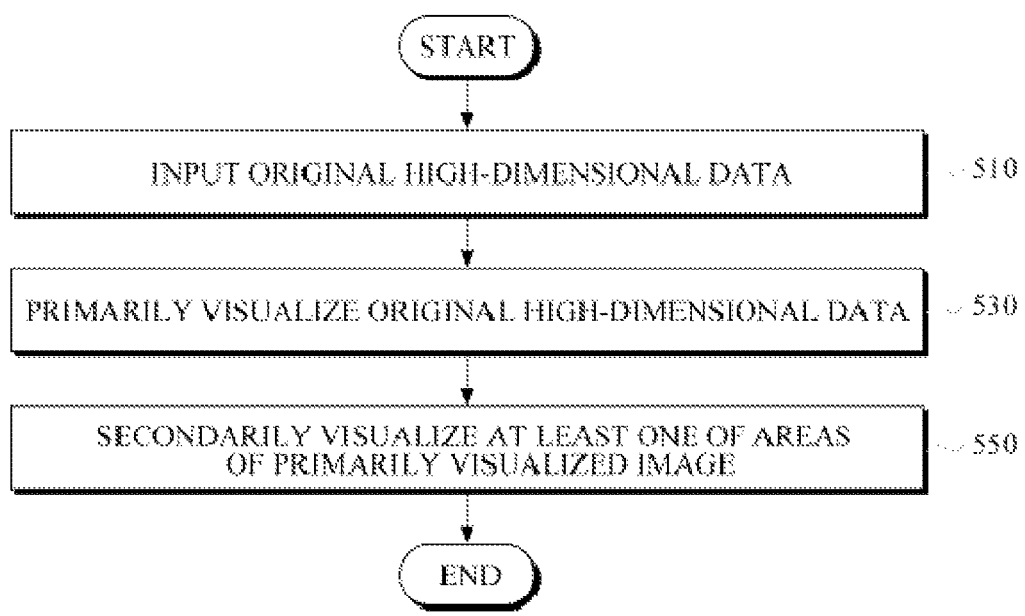
FIG. 5 is a flow chart illustrating an example of a method producing high-dimensional data visualization, in accordance with an illustrative configuration.

FIG. 5 is a flow chart illustrating an example of a method producing high-dimensional data visualization, in accordance with an illustrative configuration.

Referring to FIG. 5, at operation 510, original high-dimensional data is input. At operation 530, the input high-dimensional data is primarily visualized. The primarily-visualized image, which is created in the primary visualization unit includes a dimension lower than a dimension of high-dimensional data and a secondary visualized image. For example, in case that the high-dimensional data is four-dimensional, the primarily-visualized image may be one-dimensional to three-dimensional.

At operation 550, the high-dimensional data, which is included in at least one of the areas of the primarily-visualized image, may be secondarily visualized. Furthermore, the secondarily-visualized image, which is created through the secondarily visualization, may be higher-dimensional than the primarily-visualized image. For example, in case that the high-dimensional data is four-dimensional and the primarily-visualized image is two-dimensional, the secondarily-visualized image may be visualized into three to four dimensions.

In one embodiment, a user may select a dimension of the primarily-visualized image and the secondarily-visualized image. In another embodiment, the primarily-visualized image and the secondarily visualization image may be created according to a pre-set dimension. In other words, the dimension of the primarily-visualized image and the secondarily-visualized image may vary according to the dimension, characteristics, flexibility of analyzing data, and the user's selection.

Figure 6:
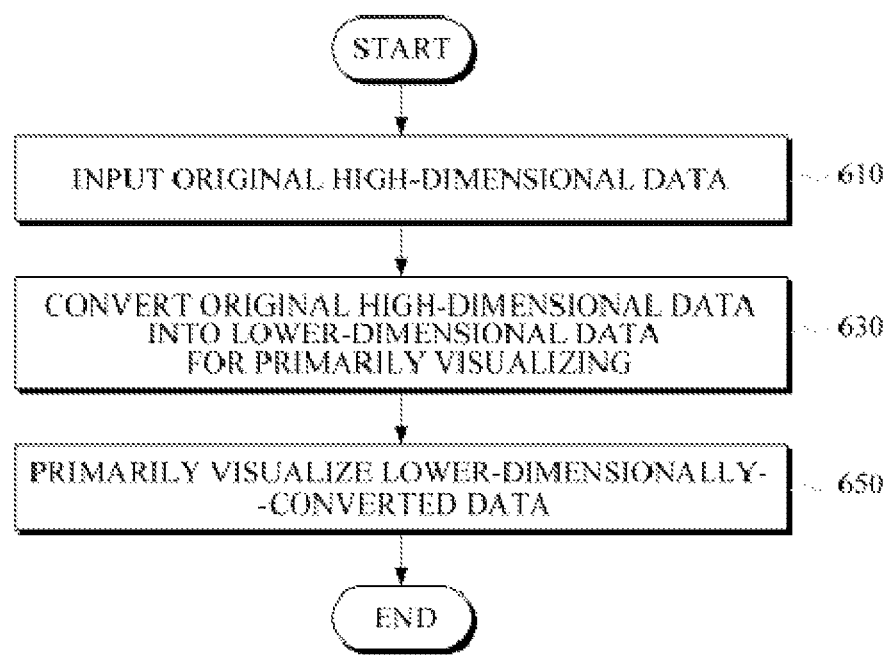
FIG. 6 is a flow chart illustrating an example of a procedure to primarily visualize, in accordance with an illustrative configuration.

FIG. 6 is a flow chart illustrating an example of a procedure to primarily visualize, in accordance with an illustrative configuration.

Referring to FIG. 6, at operation 610, high-dimensional data is input. At operation 630, the input high-dimensional data is converted into data for primarily visualizing. In one example, the data for primarily visualizing is lower-dimensional than the input high-dimensional data and the secondarily-visualized image.

As previously explained, techniques to convert the high-dimensional data for primarily visualizing may have various dimension reduction techniques, including feature extraction such as principal component analysis (PCA), non-negative matrix factorization (NMF), multidimensional scaling (MDS), isomap, local linear embedding (LLE), linear discriminant analysis (LDA). The high-dimensional data for primarily visualizing may also include the feature selection such as information gain, or mutual information. However, the dimension reduction techniques to convert the high-dimensional data into low-dimensional data are not limited to the above, and various dimension reduction techniques may be used according to the dimension, characteristics of the data, and the primarily-visualized image.

At operation 650, the converted data for primarily visualizing is primarily visualized. In an embodiment, a form of the primarily-visualized image created by primarily visualizing is selected.

Figure 7:
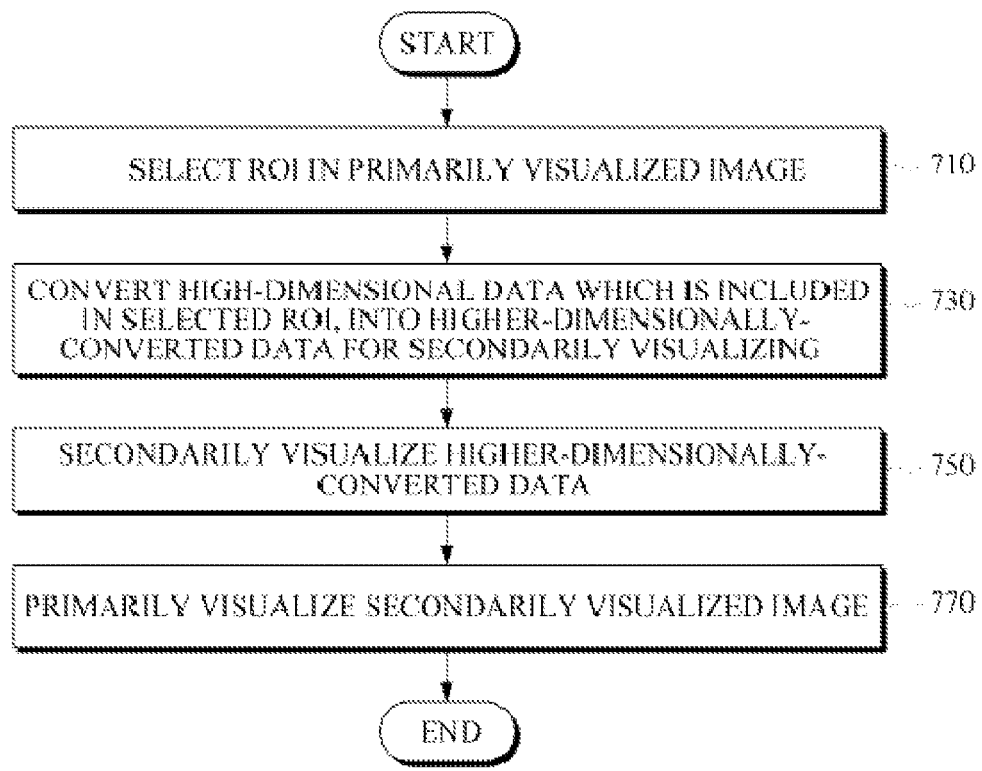
FIG. 7 is a flow chart illustrating an example of a procedure to secondarily visualize, in accordance with an illustrative configuration.

FIG. 7 is a flow chart illustrating an example of a procedure to secondarily visualize, in accordance with an illustrative configuration.

Referring to FIG. 7, at operation 710, an ROI in a primarily-visualized image is selected. In an embodiment, at least one of the areas of the primarily-visualized image may be selected as an ROI, and more than one ROI may be selected.

In response to the ROI being selected from the primarily-visualized image, at operation 730, the high-dimensional data that is included in the selected ROI is converted into higher-dimensional data than the high-dimensional data in the primarily-visualized image. Techniques to convert the high-dimensional data for secondarily visualizing may be the same as the techniques which are used in primarily visualizing. However, other similar techniques may be implemented. Dimension reduction techniques used in primarily visualizing and secondarily visualizing may be different according to a dimension of the visualization, characteristics of the data, and a form of the visualization.

At operation 750, the converted data for secondarily visualizing is secondarily visualized. In one example, a user may select a form of the secondarily-visualized image. Also, the secondarily-visualized image may be enlarged, reduced, and/or rotated.

At 770, the secondarily-visualized image is converted into the primarily-visualized image. For example, the secondarily-visualized image is converted into a primarily-visualized image by rotating the secondarily-visualized image and then projecting the rotated image.

It is to be understood that in the embodiment of the present invention, the operations in FIGS. 5 to 7 are performed in the sequence and manner as shown although the order of some steps and the like may be changed without departing from the spirit and scope of the present invention. In accordance with an illustrative example, a computer program embodied on a non-transitory computer-readable medium may also be provided, encoding instructions to perform at least the method described in FIGS. 5 to 7.

Program instructions to perform a method described in FIGS. 5 to 7, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method to visualize high-dimensional data, comprising:
   creating, with a processor, an n-dimensional primarily-visualized image of the high-dimensional data, wherein n is less than a number of dimensions of the high-dimensional data, by using any of:
   a dimension reduction according to a dimension of the primarily-visualized image, a dimension reduction according to characteristics of the data, or a dimension reduction according to a form of the primarily-visualized image;
   selecting the high-dimensional data in an area of the primarily-visualized image;
   creating an (n+m)-dimensional secondarily-visualized image of the selected high-dimensional data, wherein m is greater than or equal to one;
   manipulating the secondarily-visualized image by enlarging, reducing, or rotating the secondarily-visualized image, thereby creating a new visualization having characteristics of the selected high-dimensional data that are more clearly visualized than in the secondarily-visualized image; and
   converting the manipulated secondarily-visualized image into an n-dimensional image, such that the new visualization is preserved in the n-dimensional image;
   wherein n is less than a number of dimensions of the high-dimensional data, by using feature extraction, feature selection, or a combination thereof;
   wherein the feature extraction includes any of:
   a non-negative matrix factorization (NMF),
   an isomap,
   a local linear embedding (LLE), and
   linear discriminant analysis (LDA); and
   wherein the feature selection includes any of:
   feature selection based on information gain, and
   feature selection based on mutual information.

2. The method of claim 1, wherein the primarily-visualized image is a two-dimensional (2D) image.

3. The method of claim 1, wherein the secondarily-visualized image is a three-dimensional (3D) image.

4. The method of claim 1, wherein the creating the primarily-visualized image further comprises:
   converting the high-dimensional data into a lower-dimensional data, and
   creating the primarily-visualized image using the converted lower-dimensional data.

5. The method of claim 1, wherein the creating the secondarily-visualized image further comprises:
   selecting a region of interest (ROI) in the primarily-visualized image,
   converting the high-dimensional data in the selected ROI into higher-dimensional data, and
   creating the secondarily-visualized image using the converted higher-dimensional data.

6. The method of claim 1, wherein the primarily-visualized image is a scatter plot.

7. The method of claim 1, wherein the secondarily-visualized image is a scatter plot.

8. The method of claim 1, wherein the selecting the high-dimensional data in an area of the primarily-visualized image comprises:
   applying a window of a predefined size to the primarily-visualized image, such that each portion of the primarily-visualized image within the window is used to create the secondarily-visualized image.

9. An apparatus for visualizing high-dimensional data, comprising:
 a processor including a visualization unit, including
  a primary visualization unit configured to create an n-dimensional primarily-visualized image of the high-dimensional data, wherein n is less than a number of dimensions of the high-dimensional data, by using any of:
   a dimension reduction according to a dimension of the primarily-visualized image, a dimension reduction according to characteristics of the data, or a dimension reduction according to a form of the primarily-visualized image; and
  a secondary visualization unit configured to
   select the high-dimensional data in an area of the primarily-visualized image;
   create an (n+m)-dimensional secondarily-visualized image of the selected high-dimensional data, wherein m is greater than or equal to one; and
   manipulate the secondarily-visualized image by enlarging, reducing, or rotating the secondarily-visualized image, thereby creating a new visualization having characteristics of the selected high-dimensional data that are more clearly visualized than in the secondarily-visualized image;
  wherein the primary visualization unit is further configured to convert the manipulated secondarily-visualized image into an n-dimensional image, such that the new visualization is preserved in the n-dimensional image;
  wherein n is less than a number of dimensions of the high-dimensional data, by using feature extraction, feature selection, or a combination thereof;
  wherein the feature extraction includes any of:
   a non-negative matrix factorization (NMF),
   an isomap,
   a local linear embedding (LLE), and
   linear discriminant analysis (LDA); and
  wherein the feature selection includes any of:
   feature selection based on information gain, and
   feature selection based on mutual information.

10. The apparatus of claim 9, further comprising:
 a user interaction unit comprising a user interface, and configured to display at least one of the primarily-visualized image and the secondarily-visualized image.

11. The apparatus of claim 9, wherein the primarily-visualized image is a two-dimensional (2D) image.

12. The apparatus of claim 9, wherein the secondarily-visualized image is a three-dimensional (3D) image.

13. The apparatus of claim 9, wherein the primary visualization unit is further configured to convert the high-dimensional data into a lower-dimensional data, and to create the primarily-visualized image using the converted lower-dimensional data.

14. The apparatus of claim 9, wherein the secondary visualization unit is further configured to select a region of interest (ROI) in the primarily-visualized image, to convert the high-dimensional data in the selected ROI into higher-dimensional data, and to create the secondarily-visualized image using the converted higher-dimensional data.

15. The apparatus of claim 14, wherein the secondary visualization unit selects the ROI from the an area of the primarily-visualized image.

16. The apparatus of claim 9, wherein the primarily-visualized image is a scatter plot.

17. The apparatus of claim 9, wherein the secondarily-visualized image is a scatter plot.

18. The apparatus of claim 9, wherein the secondary visualization unit is configured to select the high-dimensional data in the an area of the primarily-visualized image by applying a window of a predefined size to the primarily-visualized image, such that each portion of the primarily-visualized image within the window is used to create the secondarily-visualized image.

19. A method to visualize high-dimensional data, comprising:
 converting, in a processor, the high-dimensional data into data to display an n-dimensional primarily-visualized image, wherein the converted data is lower-dimensional than the high-dimensional data, and wherein n is less than a number of dimensions of the high-dimensional data, by using any of:
  a dimension reduction according to a dimension of the primarily-visualized image, a dimension reduction according to characteristics of the data, or a dimension reduction according to a form of the primarily-visualized image;
 selecting data among the converted data in a region of interest (ROI) of the primarily-visualized image; and
 converting the selected data in the ROI into higher-dimensional data to display an (n+m)-dimensional secondarily-visualized image, wherein m is greater than or equal to one;
 manipulating the secondarily-visualized image by enlarging, reducing, or rotating the secondarily-visualized image, thereby creating a new visualization having characteristics of the selected data that are more clearly visualized than in the secondarily-visualized image; and
 converting the manipulated secondarily-visualized image into an n-dimensional image, such that the new visualization is preserved in the n-dimensional image;
 wherein n is less than a number of dimensions of the high-dimensional data, by using feature extraction, feature selection, or a combination thereof;
 wherein the feature extraction includes any of:
  a non-negative matrix factorization (NMF),
  an isomap,
  a local linear embedding (LLE), and
  linear discriminant analysis (LDA); and
 wherein the feature selection includes any of:
  feature selection based on information pain, and
  feature selection based on mutual information.

20. The method of claim 19, further comprising:
 setting n and m according to at least one of a dimension and characteristics of data, an availability of data analysis, and a user input.

21. The method of claim 19, further comprising:
 enabling n and m to be selected through a user interaction unit.

22. The method of claim 19, further comprising:
 configuring the high-dimensional data to be four-dimensional; and
 configuring the primarily-visualized image to be one-dimensional, two-dimensional, or three-dimensional.

23. The method of claim 19, wherein the converting the manipulated secondarily-visualized image into an n-dimensional image comprises:
 rotating the secondarily-visualized image; and
 projecting the rotated image.

24. The method of claim 19, wherein the selecting the data in the ROI of the primarily-visualized image comprises:

applying a window of a predefined size to the primarily-visualized image, such that each portion of the primarily-visualized image within the window is used to create the secondarily-visualized image.

* * * * *